United States Patent
Ichikawa et al.

(10) Patent No.: US 7,897,084 B2
(45) Date of Patent: Mar. 1, 2011

(54) MANUFACTURING METHOD OF VALVE UNIT

(75) Inventors: Masato Ichikawa, Kariya (JP); Tsuyoshi Arai, Nagoya (JP); Naoki Hiraiwa, Toyokawa (JP); Ryo Sano, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/420,269

(22) Filed: Apr. 8, 2009

(65) Prior Publication Data

US 2009/0255121 A1    Oct. 15, 2009

(30) Foreign Application Priority Data

Apr. 11, 2008    (JP) .................................. 2008-103704

(51) Int. Cl.
*B29C 45/16*    (2006.01)
*B29C 65/00*    (2006.01)

(52) U.S. Cl. ..................... 264/242; 264/238; 264/328.1; 264/328.8

(58) Field of Classification Search ........................ None
See application file for complete search history.

(56) References Cited

U.S. PATENT DOCUMENTS

| | | | |
|---|---|---|---|
| 7,063,303 B2 | 6/2006 | Makino et al. | |
| 2005/0022781 A1 | 2/2005 | Arai et al. | |
| 2005/0097745 A1* | 5/2005 | Arai et al. ................. | 29/890.12 |
| 2007/0051913 A1 | 3/2007 | Torii et al. | |

FOREIGN PATENT DOCUMENTS

| | | |
|---|---|---|
| JP | 11-294203 | * 10/1999 |
| JP | 2000-204974 | 7/2000 |
| JP | 2003-266475 | 9/2003 |
| JP | 2004-092617 | 3/2004 |
| JP | 2006-150875 | 6/2006 |

OTHER PUBLICATIONS

Japanese Office Action dated Jan. 26, 2010, issued in corresponding Japanese Application No. 2008-103704, with English translation.

* cited by examiner

*Primary Examiner* — Edmund H. Lee
(74) *Attorney, Agent, or Firm* — Nixon & Vanderhye PC

(57) ABSTRACT

In a manufacturing method of a valve unit, which includes a valve having a rotatable shaft that is rotatably supported by a housing through a bearing to open and close a fluid passage defined in the housing, the housing and the valve are simultaneously molded in a mold assembly. The bearing is installed between the housing and the rotatable shaft during execution of the molding of the housing and the valve.

14 Claims, 7 Drawing Sheets

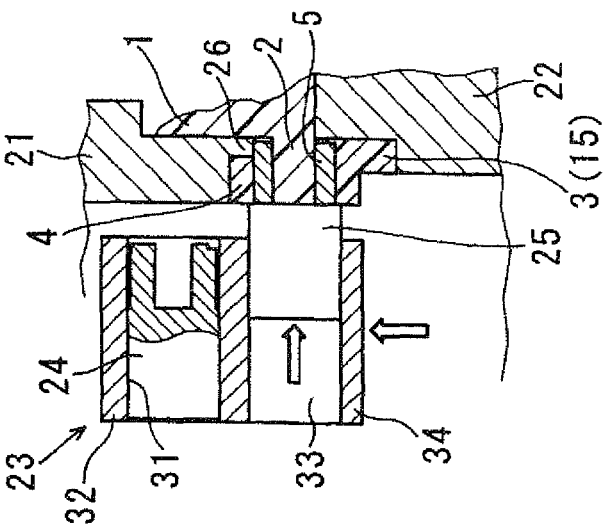
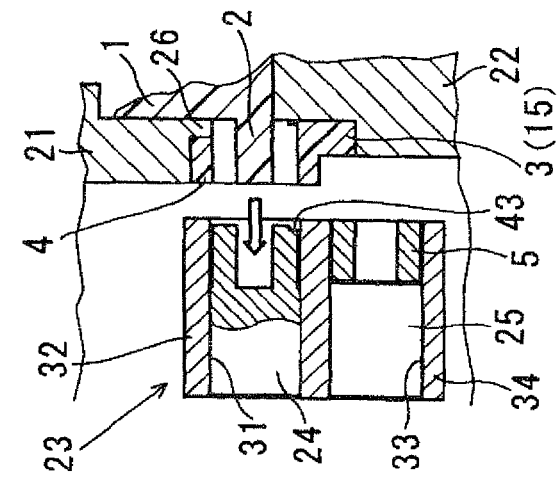
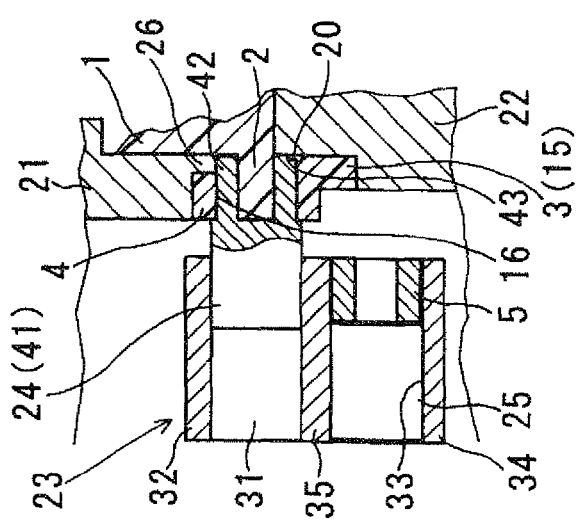

MANUFACTURING METHOD OF VALVE UNIT

CROSS REFERENCE TO RELATED APPLICATION

This application is based on and incorporates herein by reference Japanese Patent Application No. 2008-103704 filed on Apr. 11, 2008.

BACKGROUND OF THE INVENTION

1. Field of the Invention

The present invention relates to a manufacturing method of a valve unit.

2. Description of Related Art

Previously, for example, Japanese Unexamined Patent Publication No. 2007-64176A (corresponding to US 2007/0051913A1) teaches a manufacturing method of a valve unit (e.g., a valve unit serving as a swirl intake flow generating device of an internal combustion engine). According to this method, a housing and a valve are simultaneously injection molded in an injection mold assembly to form a resin product, in which the valve is rotatably installed in an intake air passage formed in the housing. Thereafter, cylindrical tubular bearings are respectively press fitted to wall surfaces of bearing receiving holes of bearing holding portions of the housing. In this way, the valve unit, which is adapted to be installed to an intake pipe (e.g., an intake manifold) of the internal combustion engine, is manufactured.

FIG. 6 shows one previously proposed valve unit of the above type. The valve unit includes a rectangular valve 101, a cylindrical tubular rotatable shaft 102, a rectangular tubular housing 103, cylindrical tubular holding portions 104 and first and second bearings (cylindrical tubular bearings) 105. The valve 101 is driven to open or close a corresponding independent intake passage of an intake manifold. The rotatable shaft 102 is formed integrally with the valve 101. The housing 103 is adapted to be installed in the intake manifold. The holding portions 104 are formed integrally in the housing 103. The first and second bearings 105 rotatably support opposed end portions of the valve 101, which are opposed to each other in the direction of the rotational axis.

First and second through holes 111 are formed in the holding portions 104, respectively, of the housing 103. First and second sliding holes 112 are formed in the first and second bearings 105, respectively.

Furthermore, FIGS. 7A and 7B show a manufacturing apparatus (hereinafter, referred to as an injection molding apparatus) for manufacturing the valve unit of FIG. 6. In the injection molding apparatus, the valve 101 and the housing 103 are simultaneously injection molded in an injection mold assembly. The injection molding apparatus includes an injection device 121, an actuator (for driving the injection device 121), the injection mold assembly 123 and another actuator (for driving the injection mold assembly 123). The injection device 121 has a cylinder and a nozzle. Molten resin is injected from the injection device 121 into the injection mold assembly 123 through a resin supply passage 122.

The injection mold assembly 123 is used to form the resin molded product by injecting the molten resin into two cavities 131, 132 defined in the injection mold assembly 123. The injection mold assembly 123 includes at least four mold blocks 141-144.

In FIGS. 7A and 7B, the valve 101, which has the rotatable shaft 102, is molded in the housing 103 while the valve 101 is held at a full open degree thereof.

Japanese Unexamined Patent Publication No. 2005-054647A (corresponding to US 2005/0022781A1) and Japanese Unexamined Patent Publication No. 2005-155595A (corresponding to US 2005/0097745A1) teach a manufacturing method of a valve unit (e.g., a valve unit serving as an electronically controlled throttle device of an internal combustion engine) that is injection molded to form a resin molded product, in which a resin valve is rotatably installed in an interior of a resin housing, while the resin valve is held at a predetermined opening degree other than a full close degree (desirably held in a full open degree) at the time of injection molding the resin housing, the resin valve and the rotatable shaft (metal shaft) simultaneously in an injection mold assembly. At the time of injection molding, the resin valve is rotatably installed in the interior of the resin housing while the resin valve is held at the predetermined opening degree other than the full close degree in view of the fact that a gap, which is formed between the inner peripheral surface of the resin housing (e.g., the cylindrical tubular throttle body) and an outer peripheral surface of the resin valve (e.g., the throttle valve), has a significant influence on the air tightness at the valve full close state.

In order to form the resin molded product, in which the resin valve is rotatably installed in the resin housing at the predetermined opening degree other than the full close degree, the metal shaft needs to be surrounded by the injection mold assembly. In order to implement this, a predetermined joint structure needs to be provided to the valve side of the bearing holding portion (or the bearing receiving portion of the insert component). This structure is disclosed in Japanese Unexamined Patent Publication No. 2005-155595A (corresponding to US 2005/0097745A1).

However, in the manufacturing method of the valve unit, i.e., in the injection molding method for simultaneously molding the resin housing and the resin valve in the same injection mold assembly recited in Japanese Unexamined Patent Publication No. 2005-054647A (corresponding to US 2005/0022781A1) and Japanese Unexamined Patent Publication No. 2005-155595A (corresponding to US 2005/0097745A1), the joint structure of Japanese Unexamined Patent Publication No. 2005-155595A (corresponding to US 2005/0097745A1) needs to be provided to the valve side of the bearing holding portion of the housing. Therefore, when the resin housing and the bearings are formed as the separate components, the manufacturing costs of the valve unit is disadvantageously increased.

Furthermore, when the cylindrical tubular bearing (see, for example, the first and second bearings 105 of FIG. 6), which has the planar end surface that is opposed to the outer peripheral surface (the lateral surface) of the valve, is used to avoid this, the bearing needs to be fixed to the through hole wall surface of the bearing holding portion of the housing, by, for example, press-fitting or the bonding agent after the removal of the resin molded product from the injection mold assembly upon the completion of the resin molding step of the housing and the valve. In such a case, the number of the manufacturing steps is increased, and thereby the manufacturing time and/or the manufacturing costs may be disadvantageously increased.

Furthermore, when the bearing installation step for installing the bearing to the bearing holding portion of the housing is performed after the completion of the resin molding step of the housing and the valve, the assembling accuracy of the bearing to the bearing holding portion of the housing may possibly vary from product to product, possibly resulting in the deterioration of the relative positional accuracy between the valve and the housing.

Thereby, the accuracy of the size of the gap between the inner peripheral surface of the housing and the outer peripheral surface (the lateral surface) of the valve in the full close state of the valve may be deteriorated, and/or the characteristics of the flow quantity of the intake air relative to the valve opening degree may be deteriorated (changed).

SUMMARY OF THE INVENTION

The present invention addresses the above disadvantages. Thus, it is an objective of the present invention to provide a manufacturing method of a valve unit, which can reduce or minimize manufacturing costs of the valve unit.

According to the present invention, there is provided a manufacturing method of a valve unit, which includes a valve having a rotatable shaft that is rotatably supported by a housing through a bearing to open and close a fluid passage defined in the housing. In the manufacturing method, the housing and the valve are simultaneously molded in a mold assembly. The bearing is installed between the housing and the rotatable shaft during execution of the molding of the housing and the valve.

BRIEF DESCRIPTION OF THE DRAWINGS

The invention, together with additional objectives, features and advantages thereof, will be best understood from the following description, the appended claims and the accompanying drawings in which:

FIGS. 3A to 3C are schematic views showing a resin molding step (a filling step, a punch core changing step, a bearing press-fitting step) of the valve unit according to the first embodiment;

DETAILED DESCRIPTION OF THE INVENTION

First Embodiment

Figure 1:
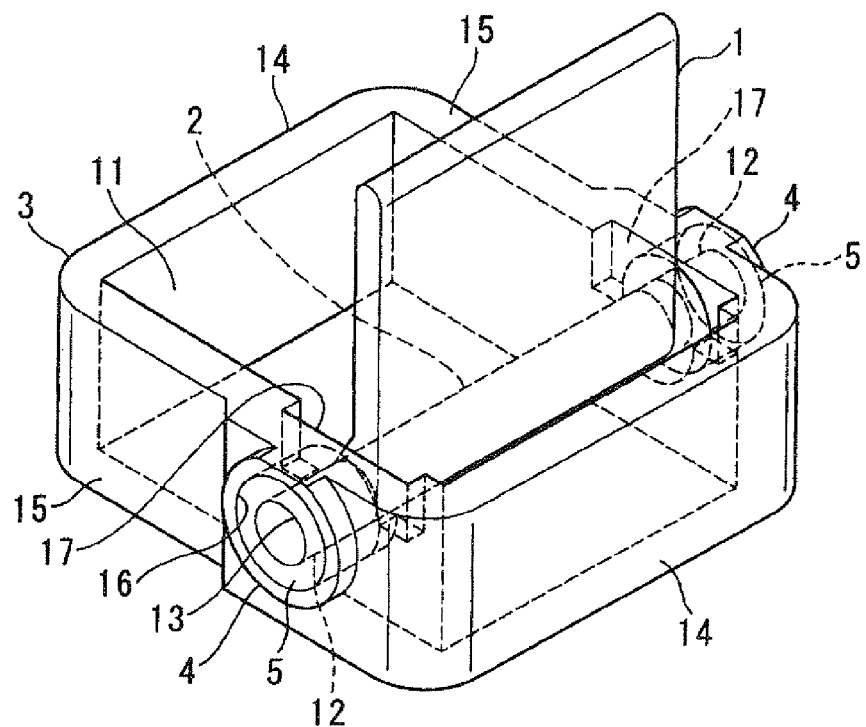
FIG. 1 is a perspective view of a valve unit according to a first embodiment of the present invention.
Figure 2:
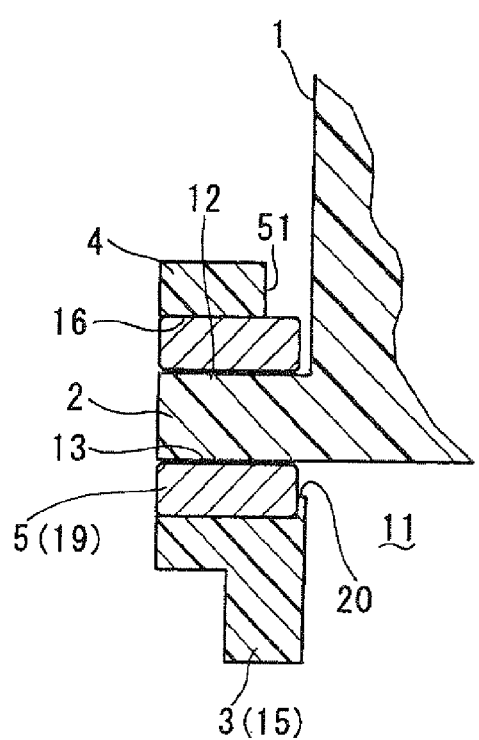
FIG. 2 is a partial enlarged cross-sectional view of a bearing structure of the valve unit of the first embodiment.

FIGS. 1 to 3C show a first embodiment of the present invention. Specifically FIG. 1 shows one of valve units (cartridges) of the first embodiment, and FIG. 2 shows a bearing structure of the valve unit.

In the present embodiment, each valve unit is used as an intake flow control valve (a tumble flow control valve abbreviated as TCV), which is installed in an intake pipe (an intake duct) of an internal combustion engine (hereinafter, simply referred to as an engine) that has a plurality of cylinders. The valve unit includes a valve (an intake flow control valve) 1, a rotatable shaft 2, a housing 3, first and second bearing holding portions 4 and first and second bearings 5. The valve 1 is made of resin and is configured into a quadrate body (a rectangular body). The valve 1 generates a vertical intake vortex flow (a tumble flow) in a combustion chamber of a corresponding one of the cylinders of the engine. The rotatable shaft 2 is configured into a cylindrical body and is formed integrally with the valve 1. The resin housing 3 is made of resin and is configured into a quadrate tubular body (a rectangular tubular body), which receives the valve 1 in a manner that permits rotation of the valve 1 in an opening direction and a closing direction thereof. The first and second bearing holding portions 4 are configured into a cylindrical body and are formed integrally with the housing 3. The first and second bearings 5 are configured into a cylindrical body and rotatably support opposed end portions, respectively, of the valve 1, which are opposed to each other in the direction of the rotational axis of the valve 1.

Here, the engine is a gasoline engine, which generates an engine output through use of a heat energy that is obtained through combustion of a mixture of clean intake air, which is filtered through an air cleaner (an air cleaner of the internal combustion engine), and atomized fuel, which is injected from an injector. The engine has an intake duct and an exhaust duct (exhaust pipe). The intake duct conducts the intake air to the combustion chamber of the respective cylinders of the engine. The exhaust duct conducts the exhaust gas, which is outputted from the combustion chamber of the respective cylinders of the engine, to the external environment through an exhaust purifying device.

An intake passage (a fluid passage) is formed in the interior of the intake duct to guide the external clean air, which is filtered through the air cleaner, to the combustion chamber of the respective cylinders of the engine through a throttle body of an electronically controlled throttle device, a surge tank and an intake manifold. The intake duct has an air cleaner case, an air cleaner hose (or an intake pipe), the throttle body, the surge tank and the intake manifold.

An engine main body has a cylinder head and a cylinder block. Each intake port, which is formed at one side of the cylinder head, is opened and closed by a poppet type intake valve. Furthermore, each exhaust port, which is formed at the other side of the cylinder head, is opened and closed by a poppet type exhaust valve. Also, each spark plug is installed to the cylinder head in such a manner that a distal end portion of the spark plug is exposed in the combustion chamber of the corresponding cylinder. Furthermore, each injector (an electronically controlled fuel injection valve), which injects fuel into the corresponding intake port at the best possible timing, is installed to the cylinder head.

The intake manifold of the present embodiment is integrally formed from synthetic resin. The intake manifold has a plurality of intake branch pipes, in each of which a corresponding independent intake passage is formed. Furthermore, an independent intake passage, which has a rectangular cross section, and a housing receiving chamber, which has a rectangular cross section, are formed in the interior of each intake branch pipe. The valve unit, specifically, the housing 3 of the valve unit is fitted and is held in the interior of each housing receiving chamber.

Here, each of the valve units of the present embodiment includes an independent intake passage 11, which is provided in the housings 3 and is connected to a corresponding one of the independent intake passages of the intake manifold to correspond with a corresponding one of the intake ports of the cylinder head. That is, the independent intake passage 11, which has the rectangular cross section, is formed in the interior of each housing 3. The independent intake passages 11 are respectively placed on the downstream side of the independent intake passages of the intake branch pipes of the intake manifold in the intake flow direction and are respectively connected to the combustion chambers of the cylinders of the engine through the intake ports of the cylinder head.

Furthermore, each valve unit is placed in an engine room of a vehicle (e.g., an automobile) and forms an intake device (an intake vortex flow generating device) of the internal combustion engine, which generates the vertical swirl flow (an intake vortex flow often referred to as a tumble flow) in the combustion chamber of the corresponding cylinder of the engine by throttling, i.e., reducing a size of the passage cross-sectional area of the corresponding independent intake passage (the fluid passage) 11, which is connected to the combustion chamber of the cylinder.

The valve units are installed in the intake system of the engine along with the electronically controlled throttle device, which has a throttle valve installed in the throttle body. The intake vortex flow generating device of the present embodiment is also used in an intake passage opening and closing device (a valve opening and closing device) of an integral multi-valve type, in which the multiple valve units are arranged in parallel at generally equal intervals in an axial direction (the direction of the rotational axis) of a pin rod (a drive shaft) in the interior of the intake manifold.

Each valve unit of the present embodiment forms the cartridge, which is fitted into and is held in the corresponding housing receiving chamber of the intake manifold. Each valve unit includes the valve 1, the housing 3 and the first and second bearings 5.

The valve 1 of each valve unit is made of the synthetic resin (e.g., fiberglass-reinforced thermoplastic resin) and is configured into the predetermined shape. Furthermore, the valve 1 is formed as a rotatable valve that has a rotational axis extending in a direction (the direction of the rotational axis), which is generally perpendicular to the axial direction (the intake flow direction) of the corresponding housing 3.

The valve 1 is rotatable to change a rotational angle (a valve opening degree) thereof within a valve operational range, which is from a full open position to a full close position, to open or close the corresponding independent intake passage 11. When the valve 1 is placed in the full open position, the flow quantity of the intake air in the independent intake passage 11 is maximized. Furthermore, when the valve 1 is placed in the full close position, the flow quantity of the intake air in the independent intake passage 11 is minimized.

The valve 1 includes the cylindrical rotatable shaft 2 (a valve fitting portion, which is also referred to as a cylindrical portion of the valve 1) and a plate shaped valve main body (a planar valve main body). The rotatable shaft 2 is rotatably received in the housing 3. The valve main body extends from the rotatable shaft 2 in a radial direction of the rotatable shaft 2, which is perpendicular to the rotational axis of the rotatable shaft 2.

The rotatable shaft 2 of the valve 1 is configured to have a cylindrical tubular shape (or a solid cylindrical rod shape) in a cross section of the rotatable shaft 2, which is perpendicular to the rotational axis of the rotatable shaft 2, so that the rotatable shaft 2 has a cylindrical tubular portion (or a solid cylindrical portion), through which a shaft receiving through hole (not shown) is formed. The shaft receiving through hole is a polygonal hole (e.g., a rectangular hole, which is also referred to as a press-fitting hole) that linearly extends in the direction of the rotational axis, which is perpendicular to the axial direction (the intake flow direction) of the independent intake passage 11.

A shaft non-press-fitting portion and a shaft press-fitting portion are formed in the interior of the rotatable shaft 2 of the valve 1. The shaft non-press-fitting portion has an inner diameter, which is larger than an outer diameter of the drive shaft. The shaft press-fitting portion securely holds a shaft fitting portion of the drive shaft by press-fitting. Alternative to the above structure, it is possible to provide only the shaft press-fitting portion in the rotatable shaft 2 of the valve 1 without forming the non-press-fitting portion.

First and second sliding portions (cylindrical tubular portions or solid cylindrical portions) 12 are provided at the opposed end portions of the rotatable shaft 2 to outwardly protrude from opposed lateral surfaces (valve left and right lateral surfaces) of the valve main body of the valve 1, which are opposed to each other in the direction of the rotational axis of the valve 1. The first and second sliding portions 12 are slidably received in first and second sliding holes 13, respectively, of first and second bearings 5.

The valve 1 is placed such that the rotatable shaft 2, which forms the rotational center of the valve 1, is displaced from a valve center of the valve 1 (a center of the valve 1 in the vertical direction of FIG. 1) in a direction perpendicular to a thickness direction of the plate of the valve main body of the valve 1. Thus, the valve 1 forms a cantilever valve.

The drive shaft of the present embodiment is inserted into the shaft receiving through hole of the rotatable shaft 2 of each of the valves 1 by press-fitting. The drive shaft is a single drive shaft, which interconnects all of the valves 1 by inserting the drive shaft through all of the rotatable shafts 2 to synchronously drive all of the valves 1. The drive shaft is rotated to change the valve opening degree of all of the valve units and is securely press fitted into the shaft receiving through holes of the rotatable shafts 2 of the valves 1.

Furthermore, the drive shaft is a polygonal shaft (a polygonal steel shaft), which has a polygonal cross section (e.g., a rectangular cross section) in a plane perpendicular to the axial direction of the drive shaft and is integrally made from a metal material. That is, the drive shaft is the metal shaft having the polygonal cross section.

Furthermore, an actuator is installed to the intake manifold to drive (i.e., to open or close) the valves 1 of the valve units through the drive shaft. The actuator includes an electric motor and a drive force transmitting mechanism (e.g., a speed reducing gear mechanism). The electric motor generates a drive force when electric power is supplied to the electric motor. The drive force transmitting mechanism transmits the drive force of the electric motor to the drive shaft.

The electric motor, which drives the valves 1 through the drive shaft, is electrically connected to a battery of the vehicle through a motor drive circuit, which is electronically controlled by an engine control unit (ECU).

Here, the valve 1 of each valve unit is fully closed by the drive force of the actuator, specifically, the drive force of the electric motor at the time of engine start or at the time of idling operation of the engine. That is, at the time of the engine start or at the time of the idling operation of the engine, the valve opening degree of each valve unit is controlled to the full close degree (the full close position) by driving the valve 1 of each valve unit in the full closing direction.

Furthermore, the valve 1 of each valve unit is fully opened by the drive force of the electric motor during the normal operation of the engine. That is, at the time of the normal operation of the engine, the valve opening degree of each valve unit is controlled to the full open degree (the full open position) by driving the valve 1 of each valve unit in the full opening direction.

Furthermore, when the supply of the electric power to the electric motor is stopped at the time of stopping the engine, the valve 1 is returned to the full open position (or an intermediate position that is slightly shifted from the full open position in the valve closing direction) by the urging force of, for example, a spring.

The housing 3 is made of the synthetic resin (e.g., fiberglass-reinforced thermoplastic resin) and is configured into a predetermined shape. The housing 3 has an inlet and an outlet. The inlet of the housing 3 is opened at an upstream end of the independent intake passage 11 in the intake flow direction and is communicated with the corresponding independent intake passage of the intake manifold. The outlet of the housing 3 is opened at a downstream end of the independent intake passage 11 in the intake flow direction and is communicated with the corresponding intake port of the engine.

The housing 3 has top and bottom walls 14 that are opposed to each other in a direction (a vertical direction of the independent intake passage 11), which is perpendicular to the axial direction (the intake flow direction) of the independent intake passage 11.

The housing 3 also has left and right lateral walls 15 that are opposed to each other in a direction (a horizontal direction that is perpendicular to the vertical direction of the independent intake passage 11), which is perpendicular to the axial direction (the intake flow direction) of the independent intake passage 11. In the housing 3, a passage wall surface (a flow passage wall surface) of the left wall 15 and a passage wall surface (a flow passage wall surface) of the right wall 15 are opposed to each other while the independent intake passage 11 is interposed therebetween. The first and second bearing holding portions 4 (cylindrical tubular portions of the housing 3) are provided to the left and right lateral walls 15, respectively, of the housing 3 and are opposed to each other while the independent intake passage 11 is interposed therebetween.

Bearing receiving holes (first and second through holes) 16 are provided in the first and second bearing holding portions 4, respectively, to rotatably receive the first and second sliding portions 12, respectively. First and second bearings 5 are securely press fitted to the hole wall surfaces (the wall surfaces of the bearing receiving holes 16), respectively, of the first and second bearing holding portions 4. That is, the first and second bearing holding portions 4 of the housing 3 slidably support the opposed end portions of the valve 1 (the first and second sliding portions 12), which are opposed to each other in the direction of the rotational axis of the valve 1, through the first and second bearings 5, respectively.

Furthermore, bearing press-fitting portions, each of which has the hole inner diameter (the corresponding diameter of the bearing receiving hole 16) that is smaller than the outer diameter of the corresponding one of the first and second bearings 5, are formed in the first and second bearing holding portions 4, respectively, to securely hold the bearing fitting parts of the first and second bearings 5.

The first and second bearing holding portions 4 and the first and second through holes 16 thereof are offset from the center axis (the center axis of the independent intake passage 11), which extends through the vertical center of the independent intake passage 11 defined between the top and bottom walls 14 or between the left and right lateral walls 15, on the one side of the housing 3 (the vertically lower side or the bottom wall 14 side). Also, the first and second bearing holding portions 4 and the first and second through holes 16 thereof are offset from the center axis (the center axis of the independent intake passage 11), which extends through the vertical center of the independent intake passage 11 defined between the top and bottom walls 14 or between the left and right lateral walls 15, on the upstream side of the independent intake passage 11 in the intake flow direction. That is, the first and second bearing holding portions 4 and the first and second through holes 16 are closer to the upstream side opening end of the housing 3 than the downstream side opening end of the housing 3 and are closer to the lower wall surface (the passage wall surface) of the bottom wall 14 of the housing 3 than the upper wall surface (the passage wall surface) of the top wall 14.

Furthermore, the valve 1 is molded in the full open state thereof in an injection mold assembly. In order to enable this, first and second recesses 17 are formed in the left and right lateral walls 15, respectively, to receive a corresponding injection mold block of the mold assembly between the lateral wall 15 and the opposed lateral surface (left or right lateral surface) of the valve main body of the valve 1, which are opposed to each other in the direction of the rotational axis of the valve main body of the valve 1.

In the present instance, each of the first and second bearings 5 is integrally formed as a cylindrical tubular body from a metal material. Each of the first and second bearings 5 has a cylindrical tubular portion 19, in which a corresponding one of the first and second sliding holes 13 is formed. The cylindrical tubular portion 19 may be configured into a generally cylindrical tubular body having recesses and protrusions (e.g., axial ridges or teeth arranged one after another at generally equal intervals in the circumferential direction) on its outer peripheral surface to limit rotation of the generally cylindrical tubular body.

The cylindrical tubular portion 19 of each of the first and second bearings 5 slidably supports a corresponding one of the first and second sliding portions 12 of the rotatable shaft 2 of the valve 1 to enable the rotation of the corresponding sliding portion 12 in the rotational direction. Furthermore, the outer peripheral part (the bearing fitting part) of the cylindrical portion 19 of each of the first and second bearings 5 is securely press-fitted to the hole wall surface, i.e., the press-fitting hole wall surface of the bearing press-fitting portion of the corresponding one of the first and second through holes 16 of the first and second bearing holding portions 4 of the housing 3.

A predetermined sliding clearance is provided between the outer peripheral surface (the sliding surface) of each of the first and second sliding portions 12 and the inner peripheral surface (the sliding surface) of the cylindrical tubular portion 19 of the corresponding one of the first and second bearings 5 to enable smooth rotation of the rotatable shaft 2 of the valve 1 in the first and second sliding holes 13.

Each of opposed end surfaces of the cylindrical tubular portion 19 of each of the first and second bearings 5 is formed as a generally planar surface.

Furthermore, one of the opposed end surfaces of the cylindrical tubular portion 19 of each of the first and second bearings 5, which is opposed to the corresponding one of the left and right lateral surfaces of the valve main body of the valve 1 through a predetermined gap, is engaged to a corresponding one of arcuate projections (stoppers) 20 that are formed in the left and right lateral walls 15, respectively, of the housing 3. Here, it should be noted that the stoppers 20 may be eliminated depending on a need.

Furthermore, the other one of the opposed end surfaces of the cylindrical tubular portion 19 of each of the first and second bearings 5, which is exposed to the outside of the housing 31 is placed to be generally flush with the outer surface of a corresponding one of the first and second bearing holding portions 4 of the housing 3.

Furthermore, each edge of the cylindrical tubular portion 19 of each of the first and second bearings 5 is arcuately chamfered, i.e., is rounded.

Next, a manufacturing method of the valve unit according to the present embodiment will be briefly described with reference to FIGS. 1 to 3C. FIGS. 3A to 3C show a resin molding step of the valve unit (a filling step, a core punch changing step and a bearing press-fitting step).

In this instance, the resin material of the intake manifold, the valve 1, the rotatable shaft 2 and the housing 3 is desirably synthetic resin (thermoplastic resin), such as polyamide (PA) resin, polybutylene terephthalate (PBT) resin, polyphenylene sulfide (PPS) resin, for achieving the required heat resistance and strength.

Furthermore, the valve unit of the present embodiment is manufactured with a valve unit manufacturing apparatus (an injection molding apparatus), in which the valve 1 and the housing 3 are simultaneously injection molded in a cavity of an injection mold assembly.

Figure 7A:
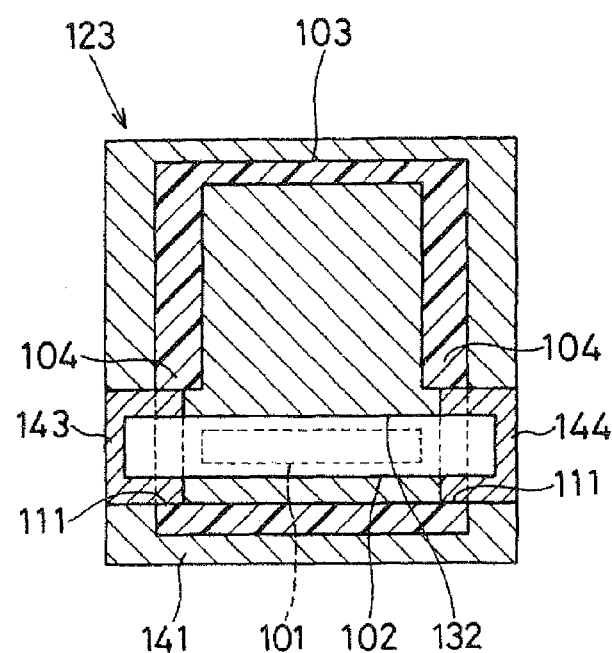
FIG. 7A is a cross-sectional view showing a previously proposed injection mold assembly.
Figure 7B:
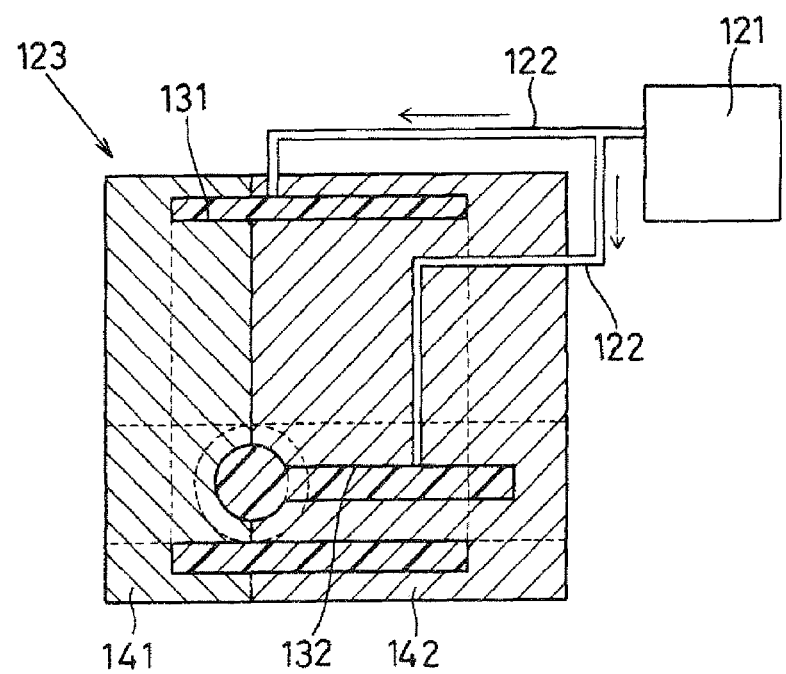
FIG. 7B is a cross sectional view showing a previously proposed injection molding apparatus having the previously proposed injection mold assembly shown in FIG. 7A.
Figure 8A:
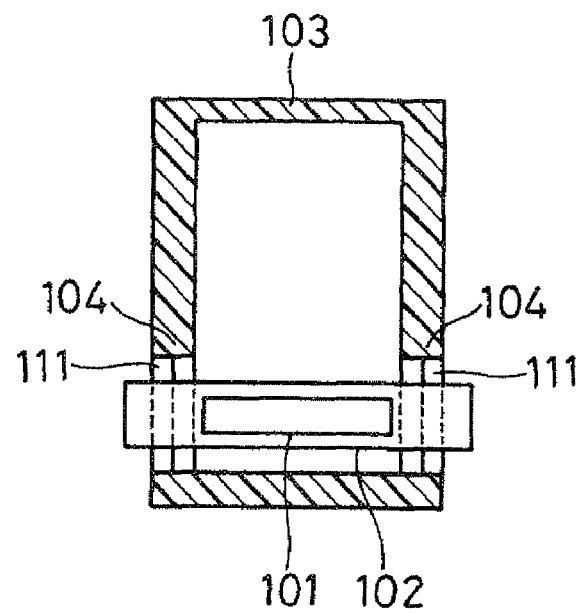
FIG. 8A is a cross-sectional view showing a state where a previously proposed molded resin product is removed from the previously proposed injection mold assembly.
Figure 8B:
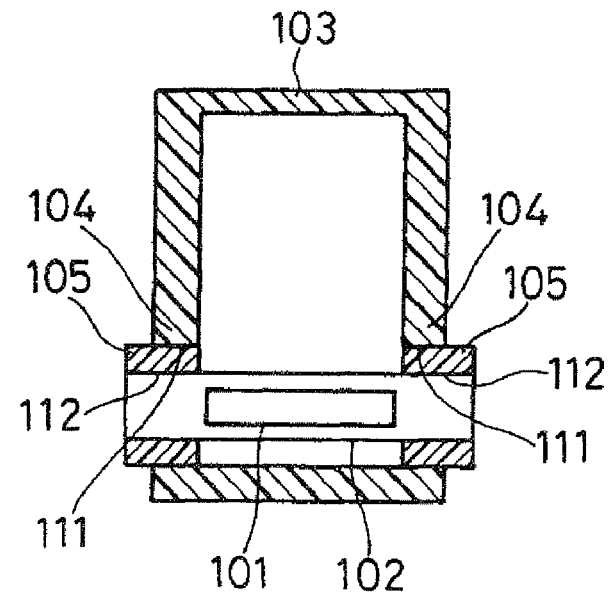
FIG. 8B is a cross-sectional view showing an assembling step (a bearing press-fitting step) of the previously proposed valve unit.

The injection molding apparatus of the present embodiment includes an injection device (not shown), a first actuator, the injection mold assembly, a second actuator, a core punch changing device and third and fourth actuators. The injection device, which is similar to the injection device 121 of FIG. 7B, includes an injection cylinder and an injection nozzle. The first actuator drives the injection device. Molten resin is injected from the injection nozzle of the injection device into the injection mold assembly. The second actuator drives at least one of the mold blocks 21, 22 of the injection mold assembly. The core punch changing device includes a mold holder 23, a mold block (also referred to as a slide block and hereinafter referred to as a slide core) 24 and a press-fitting punch 25. The third and fourth actuators drive the core punch changing device.

The injection mold assembly includes a stationary mold unit and a movable mold unit. The stationary mold unit includes at least one mold block, and the movable mold unit includes at least one mold block (e.g., a slide block also referred to as a slide core). Furthermore, the movable mold unit is movable relative to the stationary mold unit in a predetermined releasing direction.

The injection mold assembly (the stationary mold unit and the movable mold unit) include the mold blocks 21, 22, in which a valve cavity and a housing cavity are defined. The valve cavity is configured to correspond with the shape of the valve 1, which has the rotatable shaft 2. The housing cavity is configured to correspond with the shape of the housing 3, which has the independent intake passage 11 and the first and second through holes 16.

At least one of the mold blocks 21, 22 has a resin supply passage and a gate, which connect between the cavities and the outside of the injection mold assembly. The molten resin is injected from the injection nozzle of the injection device, which is placed outside of the injection mold assembly, into the resin supply passage or the gate. Furthermore, the mold holder 23 and an ejector mechanism having an ejector pin are installed to the injection mold assembly.

The mold holder 23 is provided at each of the opposed sides of the injection mold assembly. Each mold holder 23 includes a cylindrical peripheral wall (an upper cylindrical peripheral wall in the drawings) 32 and a cylindrical peripheral wall (a lower cylindrical peripheral wall in the drawings) 34. The cylindrical peripheral wall 32 defines a first receiving chamber (a mold receiving chamber) 31 therein to receive the slide core 24. The cylindrical peripheral wall 34 defines a second receiving chamber (a bearing and punch receiving chamber) 33, which receives the press-fitting punch 25 and a corresponding one of the first and second bearings 5. The third actuator linearly drives the mold holder 23 in the vertical direction (the top-to-bottom direction) in FIGS. 3A to 3C. Alternatively, the mold holder 23 may be rotated about a central axis of a partition wall 35, which is common to the cylindrical peripheral wall 32 and the cylindrical peripheral wall 34 and partitions between the first receiving chamber 31 and the second receiving chamber 33. The fourth actuator drives the slide core 24 and the press-fitting punch 25 in the left-to-right direction in FIGS. 3A to 3C.

An inner peripheral wall surface of the cylindrical peripheral wall 32 forms a core guide surface that guides the slide core 24, which is linearly driven by the fourth actuator, in the axial direction (the left-to-right direction in FIGS. 3A to 3C) of the slide core 24. An inner peripheral wall surface of the cylindrical peripheral wall 34 forms a punch guide surface that guides the press-fitting punch 25, which is linearly driven by the fourth actuator, in the axial direction (the left-to-right direction in FIGS. 3A to 3C) of the press-fitting punch 25.

The slide core 24 includes a solid cylindrical portion 41 and a cylindrical tubular portion 42. The solid cylindrical portion 41 is slidable along the core guide surface of the cylindrical peripheral wall 32. The cylindrical tubular portion 42 projects from the solid cylindrical portion 41 toward the injection mold assembly and has an outer diameter smaller than that of the solid cylindrical portion 41. A distal end groove (recess) 43 is formed in a portion (an injection mold assembly side end portion) of the cylindrical tubular portion 42 to define the stopper 20.

An outer peripheral surface of the cylindrical tubular portion 42 defines the hole wall surface of the corresponding one of the first and second bearing holding portions 4 of the housing 3. A portion (an injection mold assembly side end portion) of the outer peripheral surface of the cylindrical tubular portion 42 is engageable with a projection 26 of the mold block 21, which projects downward in FIGS. 3A to 3C. The mold block 21 is insertable in the corresponding one of the first and second recesses 17, each of which is defined between the corresponding one of the left and right lateral surfaces of the valve body of the valve 1 and the corresponding one of the left and right lateral walls 15 of the housing 3. An inner peripheral surface of the cylindrical tubular portion 42 defines the outer peripheral surface of the corresponding one of the first and second sliding portions 12.

The press-fitting punch 25 is a press-fitting jig, which press fits the corresponding one of the first and second bearings 5 when it is driven by the drive force of the fourth actuator. The press-fitting punch 25 includes a solid cylindrical portion that is slidable along the punch guide surface of the cylindrical peripheral wall 34. As shown in FIG. 3C, the outer diameter of the solid cylindrical portion of the press-fitting punch 25 is larger than an inner hole diameter (the inner diameter of the hole 16) of the corresponding one of the first and second bearing holding portions 4 of the housing 3.

At the time of resin molding (injection molding) of the valve unit, the injection mold assembly is closed (a mold closing step) by applying a closing force to the mold blocks 21, 22 of the injection mold assembly. In this mold closing step, as shown in FIG. 3A, the fourth actuator applies the drive force to the slide core 24 to place the cylindrical tubular portion 42 of the slide core 24 in the injection mold assembly. At this time, the space, which is defined by the cylindrical tubular portion 42 of the slide core 24 and the injection mold assembly having the mold blocks 21, 22, forms the valve cavity and the housing cavity (hereinafter, the valve cavity and the housing cavity will be simply and collectively referred to as the cavity).

Next, when the mold closing step is completed, the filling step starts. When the filling step starts, the molten resin (the thermoplastic resin, which is placed in the molten state upon heating thereof), which is injected from the injection nozzle of the injection device, is filled in the cavity through the gate. That is, the molten resin is injected from the injection nozzle into the injection mold assembly (including the mold blocks 21, 22 and the slide core 24) through the resin supply passage, so that the molten resin is filled in the cavity (the filling step).

At this time, each of the first and second sliding portions 12, which laterally project from the valve left and right lateral surfaces of the valve main body of the valve 1, is molded by the inner peripheral surface of the cylindrical tubular portion 42 of the corresponding slide core 24. Furthermore, each of the valve left and right lateral surfaces of the valve main body of the valve 1 is molded by the distal end surface of the cylindrical tubular portion 42 of the corresponding slide core 24. Also, the hole wall surface of each of the first and second bearing holding portions 4 of the housing 3 is molded between the inner peripheral surface of the mold block 21 and the outer peripheral surface of the cylindrical tubular portion 42 of the slide core 24. Furthermore, the stopper 20 of each of the left and right lateral walls 15 of the housing 3 is molded by the corresponding lateral surface of the mold block 22 and the distal end groove 43 of the cylindrical tubular portion 42 of the corresponding slide core 24.

Then, when the filling step is completed, a dwelling step (a pressure holding step, i.e., a pressure maintaining step) and a cooling step are executed. In the dwelling step, the pressure, which is applied to the cavity from the gate, is maintained at generally the predetermined constant pressure, and the supplemental molten resin, which corresponds to the amount of the shrinkage of the cooled resin, is further filled into the cavity. That is, in the dwelling step, which maintains the pressure of the molten resin in the cavity, the pressurization of the molten resin into the cavity is maintained, and at the same time the cooling water (cooling fluid) is guided through the cooling water passage (not shown), which is provided around the cavity. The supplemental molten resin, which corresponds to the amount of the shrinkage of the cooled resin that is cooled by the cooling water, is further filled from the injection nozzle into the cavity.

Furthermore, in the cooling step, which cools the molten resin filled in the cavity of the injection mold assembly, the molten resin in the cavity is cooled and is thereby gradually solidified with time.

At this time, in the injection molding apparatus of the present embodiment, a bearing installing step is executed to install the first and second bearings 5 during the resin molding step, more specifically in the cooling step before execution of a mold opening step. In this bearing installing step, the cylindrical tubular portion 19 of each of the first and second bearings 5 is installed between the corresponding one of the first and second sliding portions 12 of the rotatable shaft 2 of the valve 1 and the corresponding one of the first and second bearing holding portions 4 of the housing 3.

In this case, as shown in FIG. 3B, the fourth actuator is driven to pull the slide core 24 into the first receiving chamber 31 of the mold holder 23, and then the third actuator is driven to linearly upwardly move the mold holder 23 in FIG. 3B. In this way, the slide core 24 is replaced with the press-fitting punch 25.

Thereafter, the fourth actuator is driven to move the press-fitting punch 25 toward the mold assembly side, so that the outer peripheral part (the bearing fitting part) of the cylindrical tubular portion 19 of the corresponding one of the first and second bearings 5 is securely press fitted to the hole wall surface (the wall surface of the bearing receiving hole 16) of the corresponding one of the first and second bearing holding portions 4 of the housing 3, i.e., the press-fitting hole wall surface of the bearing press-fitting portion of the corresponding one of the first and second bearing holding portions 4 of the housing 3 (a bearing press-fitting step).

At this time, each of the first and second bearings 5 is press fitted for a predetermined amount in the axial direction until the end surface of the cylindrical tubular portion 19 of the bearing 5 abuts against the stopper 20 of the corresponding one of the left and right lateral walls 15 of the housing 3.

As described above, according to the present embodiment, in the resin molding step, specifically, in the cooling step, the bearing press-fitting step is executed to press fit the outer peripheral part (the bearing fitting part) of the cylindrical tubular portion 19 of each of the first and second bearings 5 into the hole wall surface of the corresponding one of the first and second through holes 16 of the first and second bearing holding portions 4 of the housing 3.

After the completion of the cooling step along with the bearing press-fitting step, the injection mold assembly is opened (the mold opening step).

After the completion of the mold opening step, the ejector pin of the ejector mechanism, which is provided to the injection mold assembly, is driven by the fifth actuator to remove the molded product from the mold blocks 21, 22 of the injection mold assembly (an ejecting step).

In this way, as shown in FIG. 1, the resin molded product (the injection molded product, i.e., the thermoplastic resin product), in which the valve 1 and the rotatable shaft 2 thereof are rotatably installed in the housing 3, is manufactured through the simultaneous molding of the valve 1, the rotatable shaft 2 and the housing 3. Furthermore, since the bearing installing step is executed in the resin molding step, specifically, in the cooling step before the starting of the mold opening step, it is possible to eliminate the installing step of the first and second bearings 5 after the completion of the resin molding step.

In the above instance, the rotatable shaft 2 of the valve 1 is formed into the solid cylindrical body through use of the mold blocks 21, 22 of the injection mold assembly and each corresponding slide core 24. Alternatively, the rotatable shaft 2 of the valve 1 may be formed into a cylindrical tubular body (a hollow cylindrical body) through use of the injection mold assembly and the slide core. In such a case, the manufacturing costs of the rotatable shaft 2 of the valve 1 can be further reduced, and thereby the manufacturing costs of the valve unit can be reduced.

Next, advantages of the first embodiment will be described.

According to the injection molding method and the injection molding apparatus of the present embodiment, in the resin molding step, particularly, in the cooling step before the starting of the mold opening step, the bearing press-fitting step is executed to press fit the outer peripheral parts (the bearing fitting parts) of the cylindrical tubular portions 19 of the first and second bearings 5 into the hole wall surfaces of the first and second bearing holding portions 4 of the housing 3. In this way, the bearing installation step, such as the bearing press-fitting step or the swaging step, which is previously required after the resin molding step according to the previously proposed technique, is no longer required. Therefore, it is possible to reduce the manufacturing steps of the valve unit. As a result, it is possible to limit the increase in the manufacturing time of the valve unit, and thereby it is possible to reduce the manufacturing costs.

Furthermore, unlike the previously proposed technique, it is not required to perform the installing step of installing the first and second bearings 105 into the hole wall surfaces of the bearing holding portions 104 of the housing 103 after the completion of the resin molding step of the valve 101 and the housing 103. Therefore, the installation accuracy of the first and second bearings 5 relative to the hole wall surfaces of the first and second bearing holding portions 4 of the housing 3 will not substantially vary from product to product. In this way, it is possible to limit the deterioration of the relative positional accuracy between the valve 1 and the housing 3.

Thus, it is possible to limit the deterioration of the size accuracy of the gap formed between the outer peripheral surface of the valve 1 and the passage wall surface of the housing 3 in the full close state of the valve. Also, it is possible to limit the deterioration (the change) of the characteristics of the flow quantity of the intake air relative to the valve opening degree.

Furthermore, when the bearing press-fitting step of press-fitting the cylindrical tubular portions 19 of the first and second bearings 5 into the hole wall surfaces of the first and second bearing holding portions 4 of the housing 3 (the installing step of the first and second bearings 5 to the housing 3) is executed during the resin molding step for simultaneously injection molding the valve 1, the rotatable shaft 2 and the housing 3 in the cavity, particularly in the cooling step before the starting of the mold opening step, it is not required to provide the complicated joint structure to the first and second bearing holding portions 4 of the housing 3 even in the case where the housing 3 and the first and second bearings 5 are formed as the separate components. Thus, it is possible to limit the increase of the manufacturing costs of the valve unit.

Furthermore, when the bearing press-fitting step of securely press-fitting the cylindrical tubular portions 19 of the first and second bearings 5 into the hole wall surfaces of the first and second bearing holding portions 4 of the housing 3 (the installing step of installing the first and second bearings 5 to the housing 3) is executed during the resin molding step for simultaneously injection molding the valve 1, the rotatable shaft 2 and the housing 3 in the cavity, particularly in the cooling step before the starting of the mold opening step, the cylindrical tubular portions 19 of the first and second bearing 5 can be securely press fitted into the hole wall surfaces of the first and second bearing holding portions 4 of the housing 3 in the high temperature state (the state of maintaining the high elastic modulus) of the housing (the resin molded product) 3. Therefore, even when the cylindrical tubular portions 19 of the first and second bearings 5 are press fitted into the hole wall surfaces of the first and second bearing holding portions 4 of the housing 3, cracking of the resin will less likely occur. Thereby, it is possible to improve the tolerance against the resin cracking (cracking caused by the press-fitting) at the time of press-fitting the first and second bearings 5.

Furthermore, the size variations of the first and second bearings 5 can be held within the allowable range. Thus, the finishing process of the valve unit may be reduced or eliminated. In this way, the component costs or the processing costs, which are previously required to the fining process, can be reduced or eliminated.

In order to achieve the sufficient press-fitting accuracy of the first and second bearings 5 into the hole wall surfaces of the first and second bearing holding portions 4 of the housing 3, it is desirable to execute the bearing press-fitting step during the mold clamping state in the resin molding step of the valve unit (the time period from the time of completing the mold closing step for closing the injection mold assembly to the time immediately before the starting of the mold opening step for opening the mold blocks 21, 22 of the injection mold assembly after the injection molding).

Second Embodiment

Figure 4A:
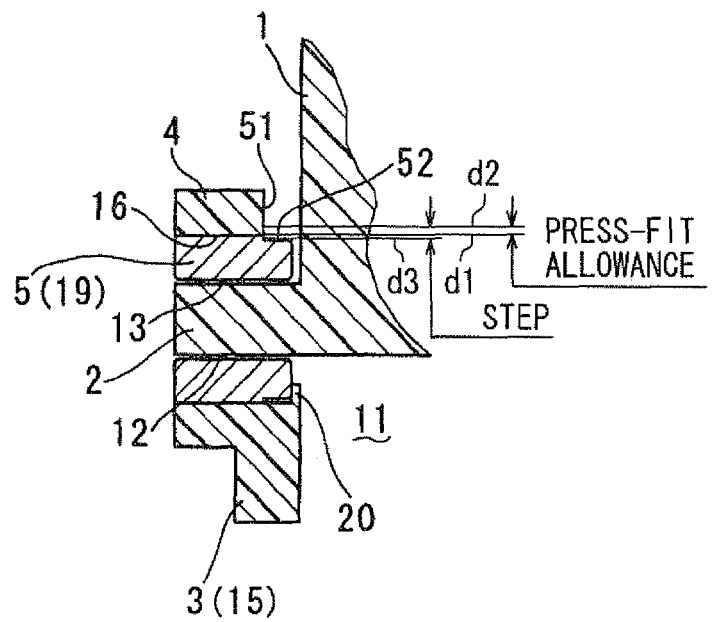
FIG. 4A is a partial enlarged cross-sectional view of a bearing structure of a valve unit according to a second embodiment of the present invention.

FIG. 4A shows a second embodiment of the present invention, more specifically, the bearing structure (the bearing holding portion 4, the bearing 5 and the sliding portion 12) of a valve unit of the second embodiment.

In the first embodiment, as indicated in FIGS. 2 to 3C, the end surface (the right end surface opposed to the corresponding lateral surface of the valve 1, particularly the right end surface on the upper side of FIGS. 2 to 3C) of each of the cylindrical tubular portions 19 of the first and second bearings 5 is exposed from, i.e., projects from a flow passage wall surface 51 of the corresponding one of the first and second bearing holding portions 4 of the housing 3 into the independent intake passage 11. Thus, at the time of executing the bearing press-fitting step in the resin molding step, when the press-fitting punch 25 is driven to securely press fit the corresponding one of the cylindrical tubular portions 19 of the first and second bearings 5 into the hole wall surface (the wall surface of the bearing receiving hole 16) of the first and second bearing holding portions 4 of the housing 3, the outer peripheral part of the end surface of the cylindrical tubular portion 19 of each of the first and second bearings 5 may possibly interfere with the projection 26 of the mold block 21 (see FIGS. 3A to 3C) before the engagement of the cylindrical tubular portion 19 with the stopper 20. This will result in the difficulty in the press-fitting of the corresponding one of the first and second bearings 5 to the predetermined press-fitting position.

In view of this, in the valve unit of the present embodiment, as shown in FIG. 4A, a stepped part 52 is provided in the outer peripheral part of each of the cylindrical tubular portions 19 of the first and second bearings 5 at a location (a bearing exposing location), which does not contact the corresponding one of the first and second bearing holding portions 4 of the housing 3 in a state (a bearing installed state) where the first and second bearings 5 are installed to the hole wall surfaces of the first and second bearing holding portions 4 of the housing 3. In this instance, the outer peripheral surface of the stepped part 52 is radially inwardly recessed from the outer peripheral surface of its adjacent part of the cylindrical tubular portion 19.

In FIG. 4A, for the purpose of illustrating the size of the stepped part 52 relative to the size of the bearing receiving hole 16 of the bearing holding portion 4 before the press-fitting of the cylindrical tubular portion 19 into the bearing receiving hole 16 of the bearing holding portion 4, the inner diameter of the bearing receiving hole 16 and the outer diameter of the cylindrical tubular portion 19 are not shown in scale. Specifically, although FIG. 4A shows the state after the press-fitting of the bearing 5 into the bearing receiving hole 16 of the bearing holding portion 4, the depicted inner diameter of the bearing receiving hole 16 (see the location of the inner peripheral surface of the unexpanded bearing receiving hole 16 indicated by a solid line d1 in FIG. 4A) is the inner diameter of the bearing receiving hole 16 before the press-fitting of the cylindrical tubular portion 19 of the bearing 5 into the bearing receiving hole 16. Actually, after the press-fitting of the cylindrical tubular portion 19 into the bearing receiving hole 16, the inner diameter of the bearing receiving hole 16 is expanded radially outward by the press-fitted cylindrical tubular portion 19 (see the location of the inner peripheral surface of the expanded bearing receiving hole 16 indicated by a solid line d2 in FIG. 4A). Here, it should be noted that the solid line d2 also indicates the location of the outer peripheral surface of the press-fitted part of the cylindrical tubular portion 19 other than the stepped part 52, and a solid line d3 indicates the location of the outer peripheral surface of the stepped part 52. A radial depth (indicated by STEP in FIG. 4A) of the stepped part 52, which is a depth radially measured from the outer peripheral surface of the press-fitted part (the adjacent part) of the cylindrical tubular portion 19 indicated by the solid line d2 to the outer peripheral surface of the stepped part 52 indicated by the solid line d3, is equal to or larger than a press fit allowance (also referred to as the amount of interference) between the outer diameter of the press-fitted part of the cylindrical tubular portion 19 indicated by the solid line d2 and the inner diameter of the unexpanded bearing receiving hole 16 indicated by the solid line d1 before the press-fitting of the cylindrical tubular portion 19 of the bearing 5 into the bearing receiving hole 16 of the bearing holding portion 4. With the above size setting, even when the end surface of the cylindrical tubular portion 19 of each of the first and second bearings 5 is exposed from, i.e., projects from the flow passage wall surface 51 of the corresponding bearing holding portion 4 into the independent intake passage 11, it is possible to limit the interference between the cylindrical tubular portion 19 of the bearing 5 and the projection 26 of the mold block 21.

Here, it should be noted that the stoppers 20 may be eliminated depending on a need in this embodiment too.

Figure 4B:
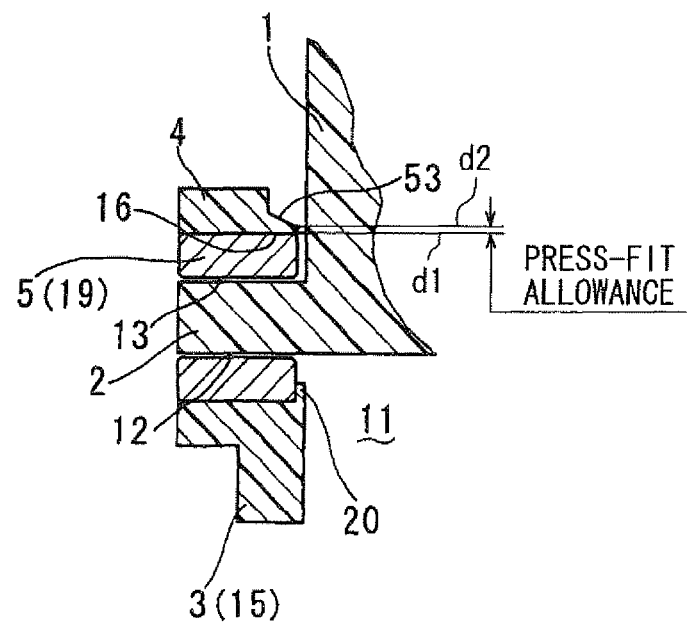
FIG. 4B is a partial enlarged cross-sectional view showing a modification of the bearing structure of the second embodiment shown in FIG. 4A.

FIG. 4B shows a modification of FIG. 4A. Here, similar to FIG. 4A, the solid line d1 of FIG. 4B indicates the location of the inner peripheral surface of the unexpanded bearing receiving hole 16, and the solid line d2 indicates the location of the inner peripheral surface of the expanded bearing receiving hole 16 upon the press-fitting, i.e., the location of the outer peripheral surface of the press-fitted part of the cylindrical tubular portion 19. In this modification of the valve unit, as shown in FIG. 4B, an axially projecting thick wall part 53 extends along the entire inner peripheral part of each of the first and second bearing holding portions 4 of the housing 3 and is tapered toward the mold assembly (i.e., toward the valve main body of the valve 1). A radial thickness (minimum radial wall thickness) of the thick wall part 53 is equal to or larger than the press-fit allowance indicated between the solid line d1 and the solid line d2 in FIG. 4B, i.e., between the cylindrical tubular portion 19 of the bearing 5 and the hole 16 of the bearing holding portion 4 measured before the press-fitting of the cylindrical tubular portion 19 of the bearing 5 into the bearing receiving hole 16. With the above construction, the end surface of the cylindrical tubular portion 19 of each of the first and second bearings 5 is not exposed from, i.e., does not project from the flow passage wall surface 51 of the corresponding holding portion 4 of the housing 3 into the independent intake passage 11, and thereby it is possible to limit the interference between the cylindrical tubular portion 19 of the bearing 5 and the projection 26 of the mold block 21.

Here, it should be noted that the stoppers 20 may be eliminated depending on a need.

Furthermore, in a case where the cylindrical tubular portion 19 of each of the first and second bearings 5 is press fitted over the outer peripheral part of the corresponding one of the first and second sliding portions 12 of the rotatable shaft 2 of the valve 1, the above limiting structure (the mold block interference limiting structure of the second embodiment) is not required.

Third Embodiment

Figure 5A:
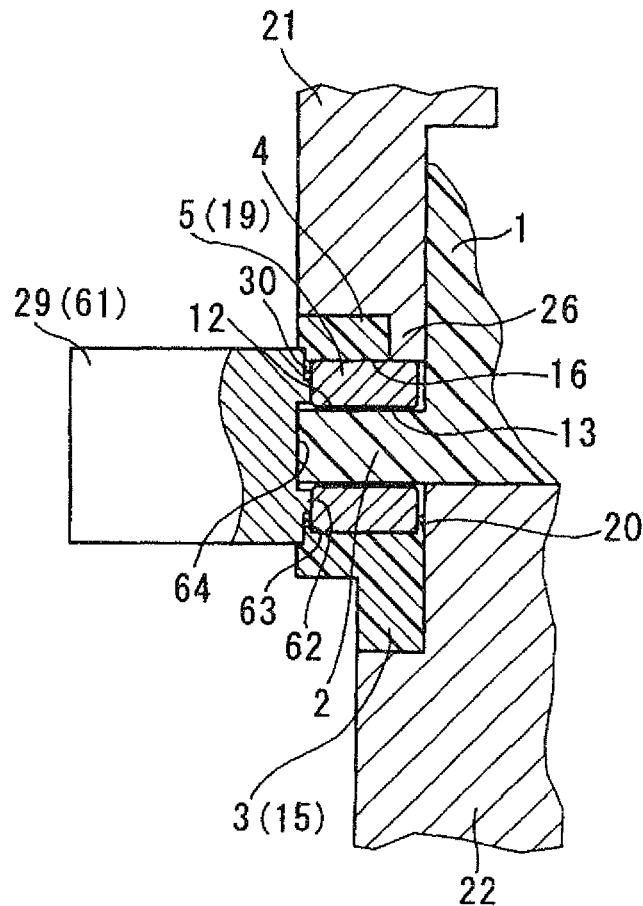
FIG. 5A is a partial enlarged cross-sectional view showing a resin molding step (a swaging step) of a valve unit according to a third embodiment of the present invention.
Figure 5B:
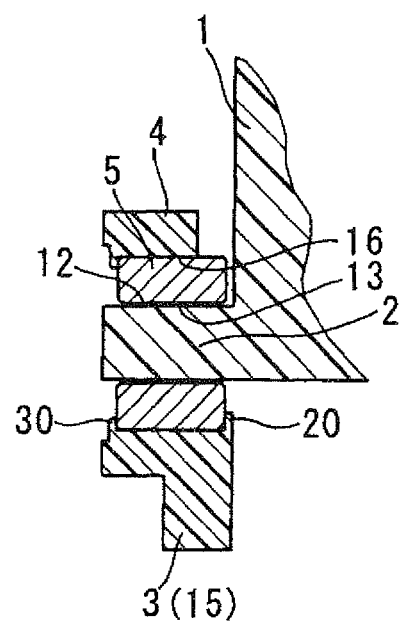
FIG. 5B is a partial enlarged cross-sectional view showing a bearing structure of the valve unit of the third embodiment.
Figure 6:
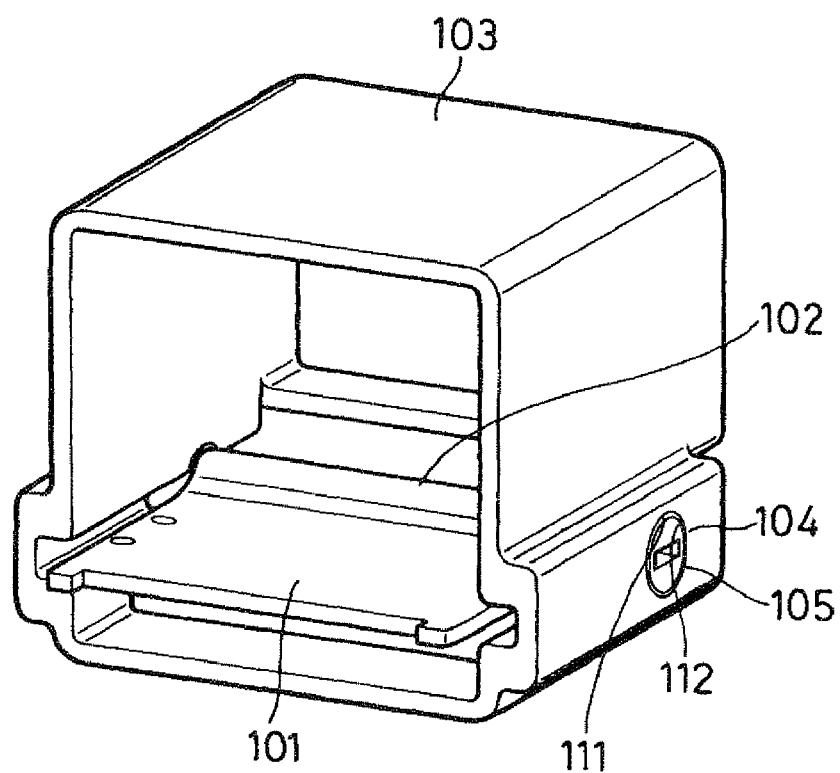
FIG. 6 is a perspective view of a previously proposed valve unit.

FIGS. 5A and 5B show a third embodiment of the present invention. Specifically, FIG. 5A shows a resin molding step (a swaging step) of the third embodiment, and FIG. 5B shows a bearing structure of a valve unit of the third embodiment after the press-fitting of the bearing 5 and the swaging of baring holding portion 4.

Although not depicted in FIGS. 5A and 5B, each mold holder 23 (see FIGS. 3A to 3C) includes the cylindrical peripheral wall 32 and the cylindrical peripheral wall 34. The cylindrical peripheral wall 32 defines the first receiving chamber (the mold receiving chamber) 31 therein to receive the slide core 24. The cylindrical peripheral wall 34 defines the second receiving chamber (the bearing and punch receiving chamber) 33, which receives a swaging punch (a swaging jig) 29 and a corresponding one of the first and second bearings 5. Similar to the first embodiment, the third actuator linearly drives the mold holder 23 in the vertical direction (the top-to-bottom direction) in FIGS. 5A and 5B.

The inner peripheral wall surface of the cylindrical peripheral wall 34 forms the punch guide surface that guides the swaging punch 29, which is linearly driven by the fourth actuator in the axial direction (the left-to-right direction in FIGS. 5A and 5B) of the swaging punch 29 to execute the swaging of the bearing holding portion 4 of the housing 3.

The swaging punch 29 includes a solid cylindrical portion 61 and a cylindrical tubular projection 62. The solid cylindrical portion 61 is slidably guided along the punch guide surface of the cylindrical peripheral wall 34. The cylindrical tubular projection 62 axially projects from a front surface of the solid cylindrical portion 61 toward the injection mold assembly and has an outer diameter that is smaller than the outer diameter of the solid cylindrical portion 61.

An annular step surface (an urging part) 63 surrounds the projection 62 on the radially outer side of the projection 62 in the front surface of the solid cylindrical portion 61. The step surface 63 has a function of swaging portion, which plastically deforms a resin part 30 that is provided at an outer side end part of the bearing holding portion 4 of the housing 3. A recess 64 is axially recessed in a center part of the front surface of the solid cylindrical portion 61 with respect to the projection 62 and the step surface 63 in a direction away from the injection mold assembly.

In the resin molding step, particularly in the cooling step before the starting of the mold opening step, the fourth actuator is driven to pull back the slide core 24 into the first receiving chamber 31 of the mold holder 23. Thereafter, the third actuator is driven to drive the mold holder 23 in the vertical direction in FIG. 5A to replace the slide core 24 with the swaging punch 29.

Next, the fourth actuator is driven to move the swaging punch 29 toward the injection mold assembly. In this way, each of the cylindrical tubular portions 19 of the first and second bearings 5 is inserted between the outer peripheral surface of the corresponding one of the first and second sliding portions 12 of the rotatable shaft 2 of the valve 1 and the inner peripheral surface of the corresponding one of the first and second bearing holding portions 4.

Then, the resin part 30, which is provided in the outer side end part of the bearing holding portion 4 of the housing 3, is plastically deformed by the step surface 63 of the swaging punch 29 to fix the other end surface of the cylindrical tubular portion 19 of the bearing 5. At this time, each of the cylindrical tubular portions 19 of the first and second bearings 5 is clamped, i.e., is held between the resin part (the radially inwardly projected, swaged part) 30 and the stopper 20 provided in the inner side end part (the passage wall surface side end part) of the corresponding one of the first and second bearing holding portions 4 of the housing 3. In this way, each of the cylindrical tubular portions 19 of the first and second bearings 5 is installed between the corresponding one of the first and second sliding portions 12 of the rotatable shaft 2 of the valve 1 and the corresponding one of the first and second bearing holding portions 4 of the housing 3.

As discussed above, in the case of the injection molding method of the valve unit and the injection molding apparatus of the present embodiment, the swaging step of swaging the resin part 30 of the bearing holding portion 4 to securely hold the corresponding one of the first and second bearings 5 is executed in the resin molding step of simultaneously molding the valve 1, the rotatable shaft 2 and the housing 3 together in the cavity of the injection mold assembly, particularly, in the cooling step before the starting of the mold opening step. In this way, the advantages similar to those of the first embodiment can be achieved.

Here, in a case where thermal swaging (also often referred to as thermal staking) is used in addition to or alternative to resin shrinking to hold each of the cylindrical tubular portions 19 of the first and second bearings 5 to the corresponding one of the first and second bearing holding portions 4 of the housing 3, the relationship between the inner diameter of the bearing holding portion 4 (the projecting length of the projection 26 of the mold block 21) and the outer diameter of the cylindrical tubular portion 19 of the bearing 5 may not be limited to the above one.

Furthermore, the outer diameter of the step surface 63 of the swaging punch 29 (a jig pin diameter) is set to be larger than the outer diameter of each of the cylindrical tubular portions 19 of the first and second bearings 5 (the inner diameter of the hole 16 of each of the first and second bearing holding portions 4) or is set to be smaller than the inner diameter of the hole 16 of each of the first and second bearing holding portions 4. With this structure of the swaging punch 29, at the time of inserting the cylindrical tubular portion 19 of the first and second bearings 5 in the direction of the rotational axis, the swaging punch 29 is inserted by the amount equal to or larger than the thickness of the cylindrical tubular portion 19 (the amount that corresponds to the projecting length of the projection 62, which projects from the step surface 63 of the swaging punch 29). In this way, the resin part 30, which is provided at the outer side end part of each of the first and second bearing holding portions 4 of the housing 3, can be effectively swaged (plastically deformed).

In the case of executing the swaging step in the resin molding step, the swaging of the resin part 30 can be effectively performed when the swaging step is executed at the timing, at which the plastic deformation of the resin part 30 can be still easily performed, in the cooling step right after the completion of the filling step or the dwelling step.

Now, modifications of the above embodiments will be described.

In the above embodiments, the present invention is applied to the intake vortex flow generating device (the valve unit).

Alternatively, the present invention may be applied to an intake air quantity control device (an electronically controlled throttle device) of the internal combustion engine, which controls the quantity of intake air, which is drawn into the combustion chamber of each cylinder of the internal combustion engine. Further alternatively, the present invention may be applied to a variable intake air control device of the internal combustion engine, which has a variable intake valve that changes a passage length or a passage cross-sectional area of an intake passage.

In the above embodiments, the intake vortex flow generating device is used to generate the vertical intake vortex flow (the tumble flow) in the combustion chamber of the corresponding one of the cylinders of the engine to promote the combustion of the air and fuel mixture. Alternatively, the intake vortex flow generating device may be constructed to generate a horizontal intake vortex flow (swirl flow) in the combustion chamber of the corresponding one of the cylinders of the engine to promote the combustion of the air and fuel mixture. Furthermore, the intake vortex flow generating device may be constructed to generate a squish vortex in the combustion chamber of the corresponding one of the cylinders of the engine to promote the combustion of the engine.

In the above embodiments, the electric actuator, which has the electric motor, is used as the valve drive device (actuator), which drives the rotatable shaft 2 of the valve 1. Alternatively, a vacuum controlled actuator, which includes a solenoid or electric vacuum control valve/may be used as the valve drive device (actuator). Further alternatively, a solenoid actuator, which includes an electromagnet (e.g., a coil) and a moving core (or an armature), may be used as the valve drive device (actuator).

Furthermore, in the above embodiments, the valve unit (the tumble flow control valve abbreviated as TVC) is used as the intake flow control valve, which has the valve placed in the intake passage formed in the intake duct and which controls the quantity of the intake air that is drawn into the combustion chamber of the engine Alternatively, it is possible to use an intake flow control valve, which has a throttle valve placed in an intake passage formed in a throttle body and which controls the quantity of the intake air that is drawn into the combustion chamber of the engine. Further alternatively, it is possible to use an intake flow control valve, which includes an idling speed control valve placed in an intake passage formed in the housing, and which controls the quantity of the intake air that bypasses the throttle valve.

Furthermore, in place of the intake air flow control valve (e.g., the TCV), an intake passage opening and closing valve, an intake passage switching valve or an intake pressure control valve may be used as the intake control valve of the present invention. Furthermore, the intake control valve of the present invention may be applied to an intake air flow control valve (a tumble control valve or a swirl control valve) or a variable intake air valve, which changes a passage length or passage cross sectional area of the intake passage. Also, a diesel engine may be used as the internal combustion engine of the present invention. Also, besides the multi-cylinder engine, a single-cylinder engine may be used as the internal combustion engine of the present invention.

Furthermore, the valve of the present invention is not limited to the valve 1 of the integral multi-valve type device and may be a single cantilever valve or a single butterfly valve as long as the valve is rotatably placed in the housing 3. Furthermore, in the above embodiments, the valve 1 in the plan view is configured into the quadrate body (the rectangular body). Alternatively, the valve in the plan view may be configured into a circular body, an ellipsoidal body, an oval body or a polygonal body. In such a case, the cross-section of the intake passage in the housing (tubular portion) of the intake dud may be appropriately changed in conformity with the shape of the valve 1.

In the above embodiments, the bearing press-fitting step and/or the swaging step is executed in the resin molding step of simultaneously injection molding the valve 1, the rotatable shaft 2 and the housing 3 in the cavity of the injection mold assembly, particularly in the cooling step before the starting of the mold opening step. Alternatively, the bearing press-fitting step and/or the swaging step may be executed in the resin molding step of simultaneously injection molding the valve 1, the rotatable shaft 2 and the housing 3 in the cavity of the injection mold assembly particularly in the period of after completion of the filling step or the dwelling step and before the completion of the mold opening step.

In the above embodiments, the bearing press-fitting step or the swaging step is executed In the resin molding step of simultaneously injection molding the valve 1, the rotatable shaft 2 and the housing 3 in the cavity of the injection mold assembly, particularly in the cooling step before the starting of the mold opening step. Alternatively, the bearing press-fitting step and/or the swaging step may be executed in the resin molding step of simultaneously injection molding the valve 1, the rotatable shaft 2 and the housing 3 in the cavity of the injection mold assembly particularly in the period of after the starting of the dwelling step before the completion of the mold opening step.

Furthermore, the first and second bearings 5 may be securely press fitted or may be securely swaged. A bearing non-press-fitting portion and a bearing press-fitting portion may be provided at the inner peripheral part of each of the first and second bearing holding portions 4 of the housing 3. Each bearing non-press-fitting portion has a hole diameter larger than the outer diameter of the corresponding one of the cylindrical tubular portions 19 of the first and second bearings 5. Each bearing press-fitting portion securely holds the corresponding one of the cylindrical tubular portions 19 of the first and second bearings 5 through the press-fitting.

In the injection molding apparatus of the above embodiments, the first to fifth actuators are provided. The first actuator drives the injection device having the injection cylinder and the injection nozzle. The second actuator drives the at least one (e.g., the movable mold block, the slide core) of the mold blocks 21, 22 of the injection mold assembly. The third and fourth actuators drive the core punch changing device that has the mold holder 23, which is associated with the mold blocks 21, 22 and which receives the slide core 24 and the press-fitting punch (press-fitting jig) 25. The fifth actuator drives the ejector mechanism, which is associated with the injection mold assembly.

The drive source of the first to fifth actuators may be a motor (e.g., a hydraulic, pneumatic or electric motor) or a cylinder (e.g., a hydraulic, pneumatic or electric cylinder). Particularly, the press-fitting or the swaging may be executed by the motor (e.g., the hydraulic, pneumatic or electric motor) or the cylinder (e.g., the hydraulic, pneumatic or electric cylinder).

In addition, the press-fitting and/or the swaging may be synchronized with the ejector mechanism, which is associated with the injection mold assembly. Alternatively, the fifth actuator, which drives the ejector mechanism, may be used for the press-fitting or the swaging. Also, the press-fitting and/or the swaging may be synchronized with the opening/closing movement (mold opening/closing movement) of the mold blocks 21, 22, which are driven by the second actuator.

Additional advantages and modifications will readily occur to those skilled in the art. The invention in its broader terms is therefore not limited to the specific details, representative apparatus, and illustrative examples shown and described.

What is claimed is:

1. A manufacturing method of a valve unit, which includes a valve having a rotatable shaft that is rotatably supported by a housing through a bearing to open and close a fluid passage defined in the housing, the manufacturing method comprising:

molding the housing and the valve simultaneously in a mold assembly, wherein the simultaneous molding of the housing and the valve includes filling molten resin into the mold assembly; and after said filling of the molten resin into the mold assembly, installing the bearing to the housing to place the bearing between the housing and the rotatable shaft of the valve in a state where the housing and the valve are held in the mold assembly during execution of the molding of the housing and the valve.

2. The manufacturing method according to claim 1, wherein:

the molding of the housing and the valve further includes:

maintaining a predetermined pressure applied to the molten resin in the mold assembly and supplying supplementary molten resin into the mold assembly to compensate an amount of shrink of the molten resin caused by cooling of the molten resin after termination of the filling of the molten resin into the mold assembly;

cooling the molten resin, which is filled in the mold assembly, following the maintaining of the predetermined pressure or after termination of the maintaining of the predetermined pressure; and opening the mold assembly after termination of the cooling of the molten resin; and the installing of the bearing between the housing and the rotatable shaft is executed after one of the termination of the filling of the molten resin and the termination of the maintaining of the predetermined pressure and before termination of the opening of the mold assembly.

3. The manufacturing method according to claim 1, wherein:

the molding of the housing and the valve further includes:

maintaining a predetermined pressure applied to the molten resin in the mold assembly and supplying supplementary molten resin into the mold assembly to compensate an amount of shrink of the molten resin caused by cooling of the molten resin after termination of the filling of the molten resin into the mold assembly;

cooling the molten resin, which is filled in the mold assembly, following the maintaining of the predetermined pressure or after termination of the maintaining of the predetermined pressure; and opening the mold assembly after termination of the cooling of the molten resin; and the installing of the bearing between the housing and the rotatable shaft is executed before starting of the opening of the mold assembly.

4. The manufacturing method according to claim 1, wherein:

the housing includes a holding portion, which is formed integrally with the housing and has a through hole therein; and the bearing includes a generally cylindrical tubular portion, which has a sliding hole therein.

5. The manufacturing method according to claim 4, wherein the installing of the bearing between the housing and the rotatable shaft includes press-fitting the bearing to a wall surface of the through hole of the holding portion.

6. The manufacturing method according to claim 5, wherein the press-fitting of the bearing includes press-fitting the bearing for a predetermined amount in an axial direction of the rotatable shaft.

7. The manufacturing method according to claim 2, wherein:
- the housing includes a holding portion, which is formed integrally with the housing and has a through hole therein;
- the bearing includes a generally cylindrical tubular portion, which has a sliding hole therein; and
- the installing of the bearing between the housing and the rotatable shaft includes press-fitting the bearing to a wall surface of the through hole of the holding portion during the cooling of the molten resin.

8. The manufacturing method according to claim 5, wherein the holding portion has an axially projecting thick wall portion that has a radial wall thickness, which is equal to or larger than a press-fit allowance between the bearing and the holding portion.

9. The manufacturing method according to claim 5, wherein:
- a stepped part is formed in an outer peripheral part of the bearing, which does not contact the holding portion upon the installing of the bearing; and
- a radial depth of the stepped part, which is radially measured from an adjacent part of the bearing that is adjacent to the stepped part, is equal to or larger than a press-fit allowance between the bearing and the holding portion.

10. The manufacturing method according to claim 4, wherein the installing of the bearing between the housing and the rotatable shaft includes swaging a part of the holding portion to plastically deform the part of the holding portion and thereby to secure the bearing with the swaged part of the holding portion.

11. The manufacturing method according to claim 2, wherein:
- the housing includes a holding portion, which is formed integrally with the housing and has a through hole therein;
- the bearing includes a generally cylindrical tubular portion, which has a sliding hole therein; and
- the installing of the bearing between the housing and the rotatable shaft includes swaging a part of the holding portion to plastically deform the part of the holding portion and thereby to secure the bearing with the swaged part of the holding portion during the cooling of the molten resin.

12. The manufacturing method according to claim 1, wherein each of opposed end surfaces of the bearing, which are axially opposed to each other, is generally planar.

13. The manufacturing method according to claim 1, wherein:
- the housing is integrally molded from thermoplastic resin; and
- the valve is integrally molded from thermoplastic resin.

14. The manufacturing method according to claim 1, wherein the molding of the housing and the valve is executed as injection molding of the housing and the valve in the mold assembly.

* * * * *